No. 639,375. Patented Dec. 19, 1899.
J. C. WILSON, Dec'd.
Z. T. GEORGE, Administrator.
FRUIT WRAPPING MACHINE.
(Application filed Feb. 26, 1897.)
(No Model.) 7 Sheets—Sheet 3.
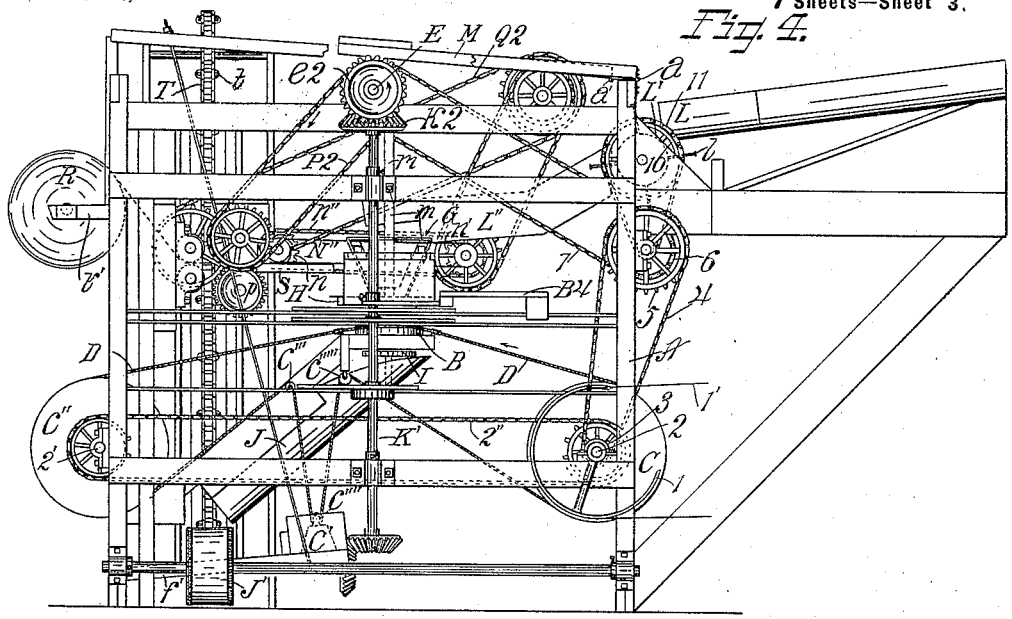
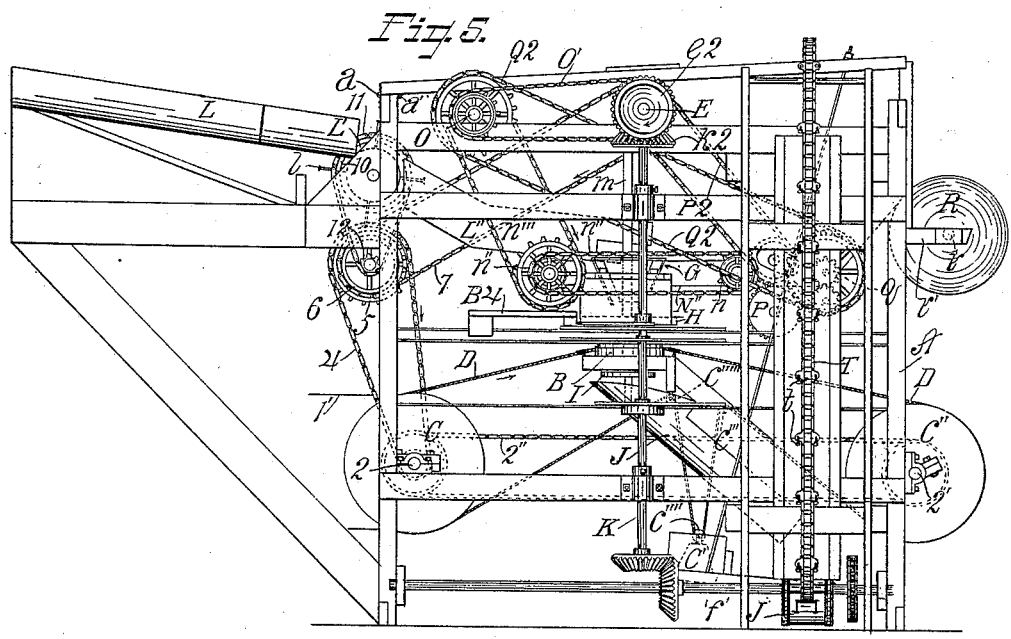

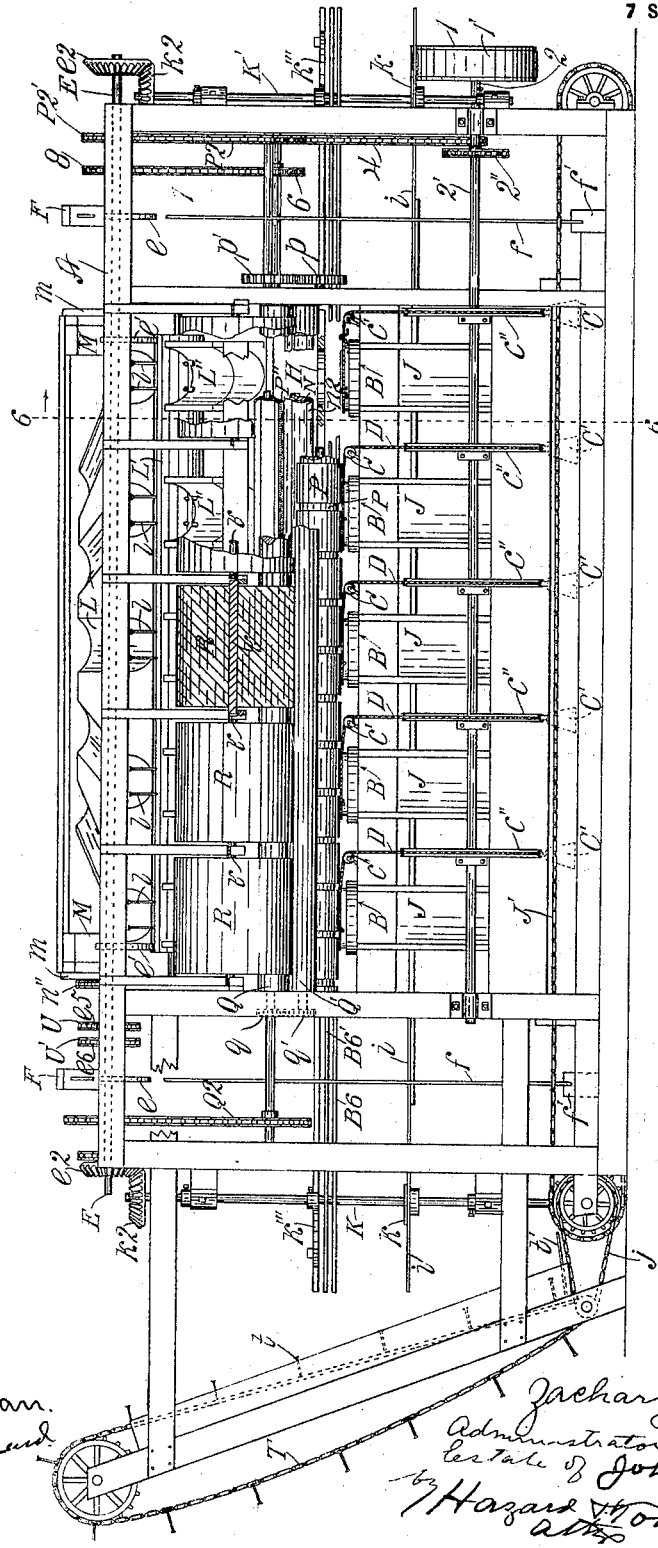

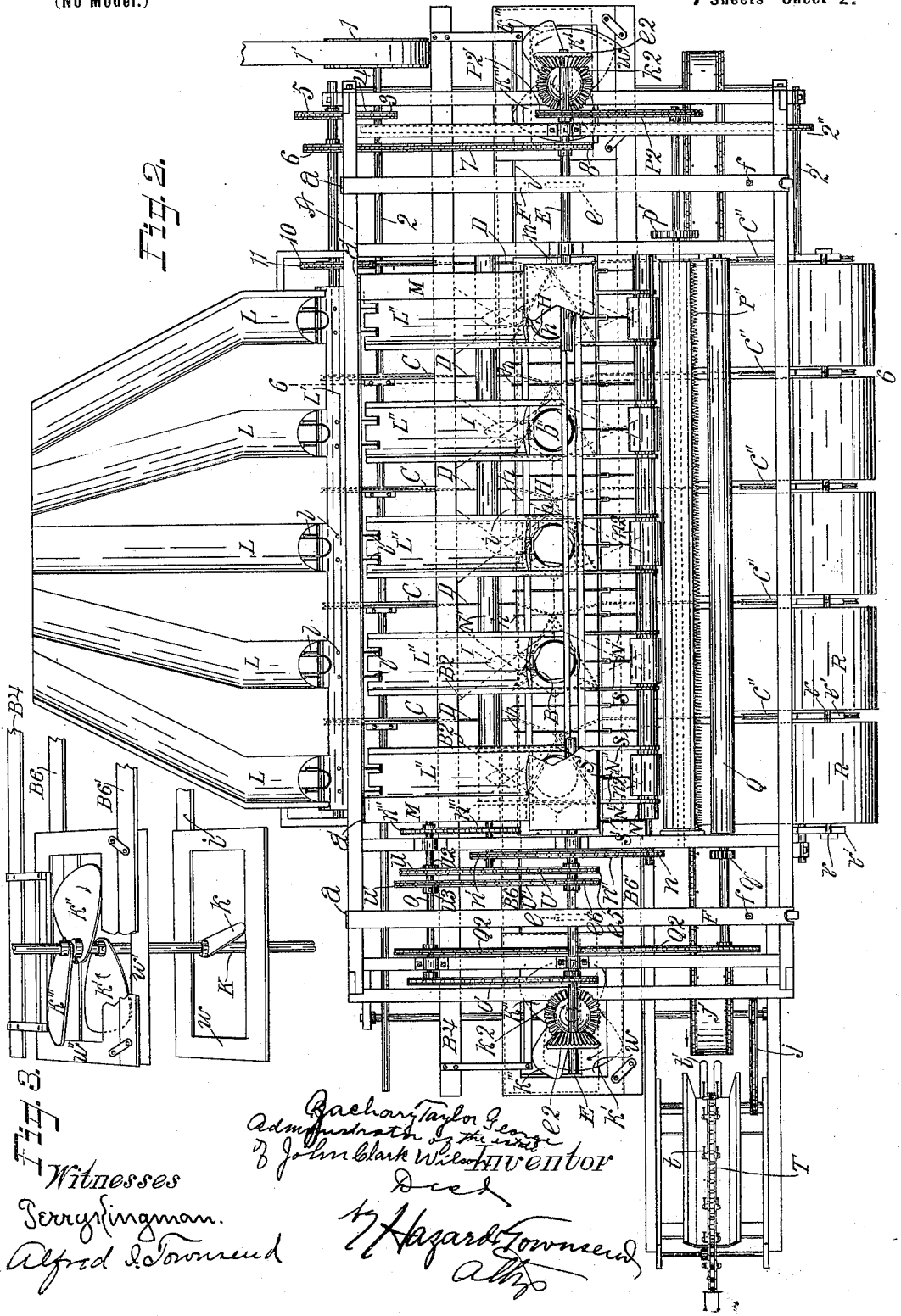

No. 639,375. Patented Dec. 19, 1899.
J. C. WILSON, Dec'd.
Z. T. GEORGE, Administrator.
FRUIT WRAPPING MACHINE.
(Application filed Feb. 26, 1897.)
(No Model.) 7 Sheets—Sheet 4.
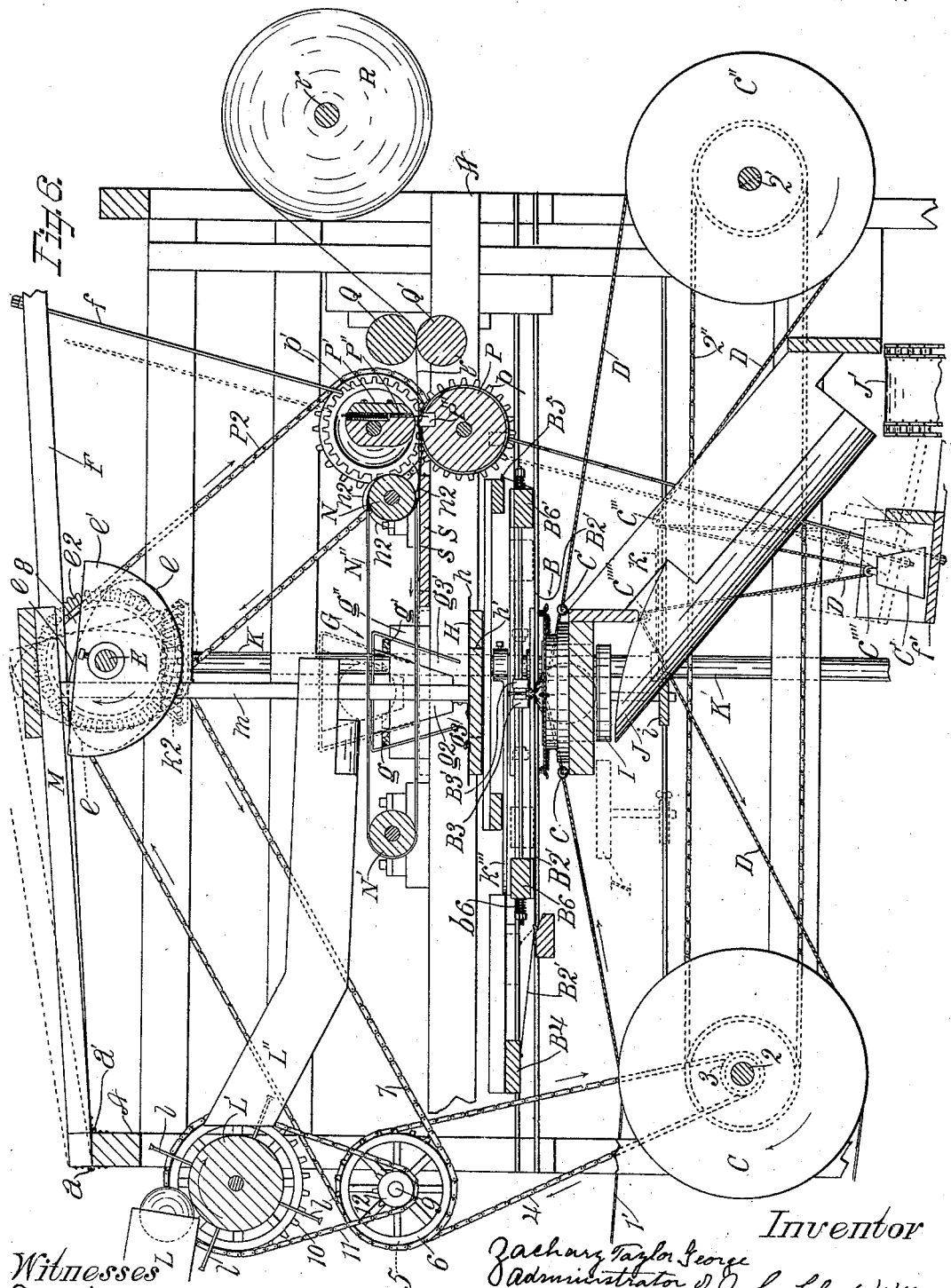
Witnesses
Perry Kingman
Alfred T. Townsend
Inventor
Zachary Taylor George
Administrator of
the Estate of John Clark Wilson Dec'd
by Hazard Townsend
Atty.
THE NORRIS PETERS CO., PHOTO-LITHO., WASHINGTON, D. C.

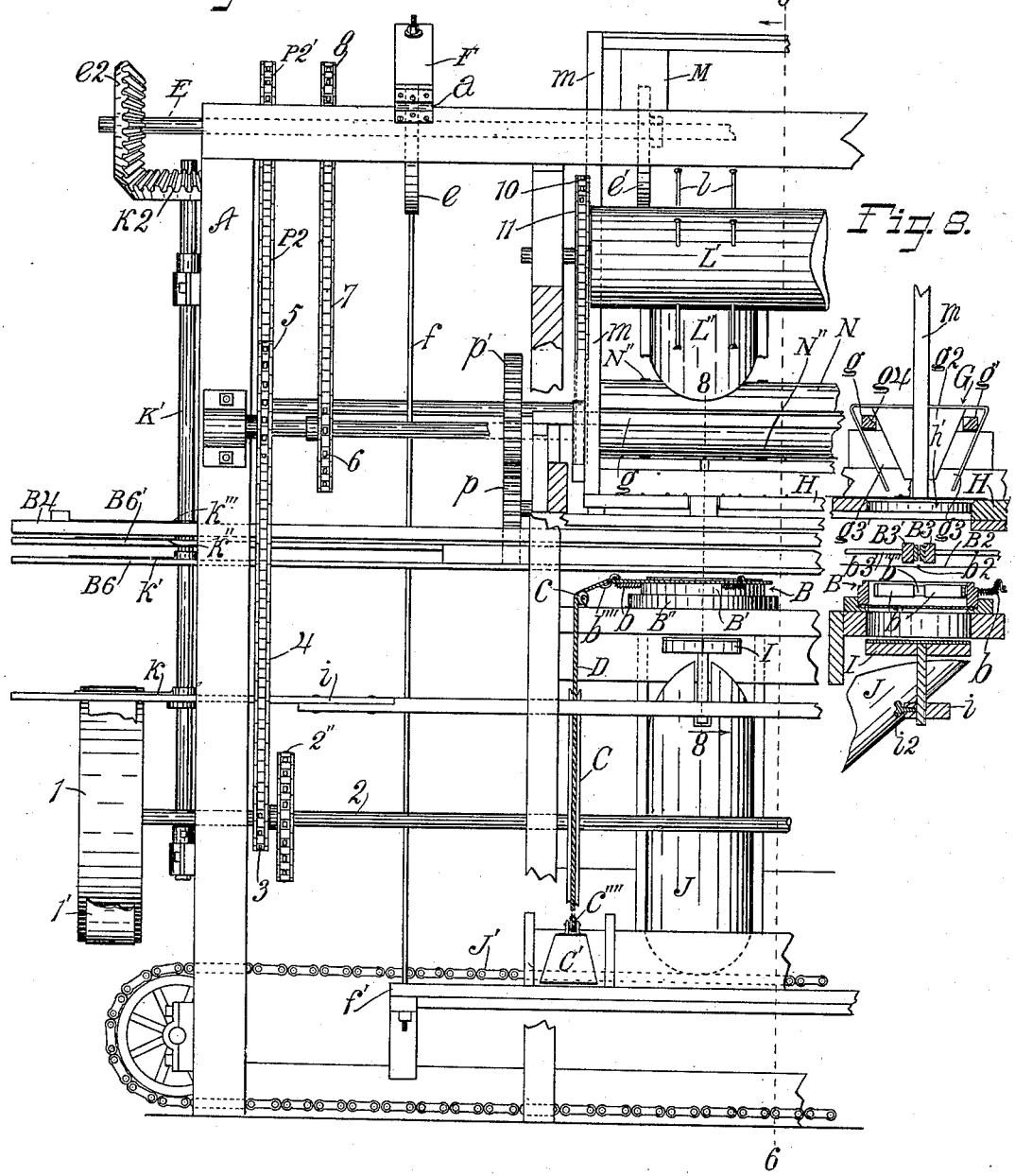

No. 639,375. Patented Dec. 19, 1899.
J. C. WILSON, Dec'd.
Z. T. GEORGE, Administrator.
FRUIT WRAPPING MACHINE.
(Application filed Feb. 26, 1897.)
(No Model.) 7 Sheets—Sheet 6.
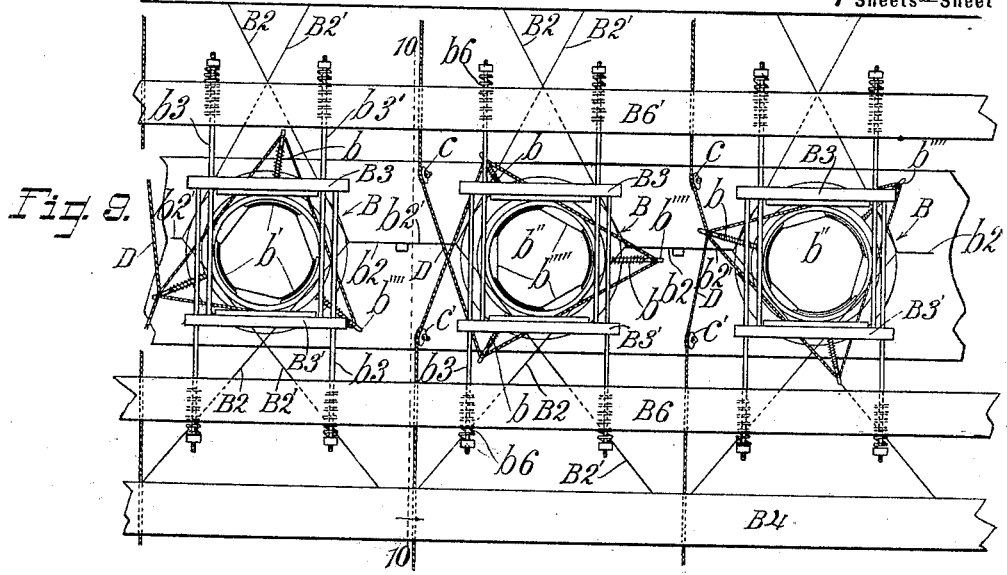
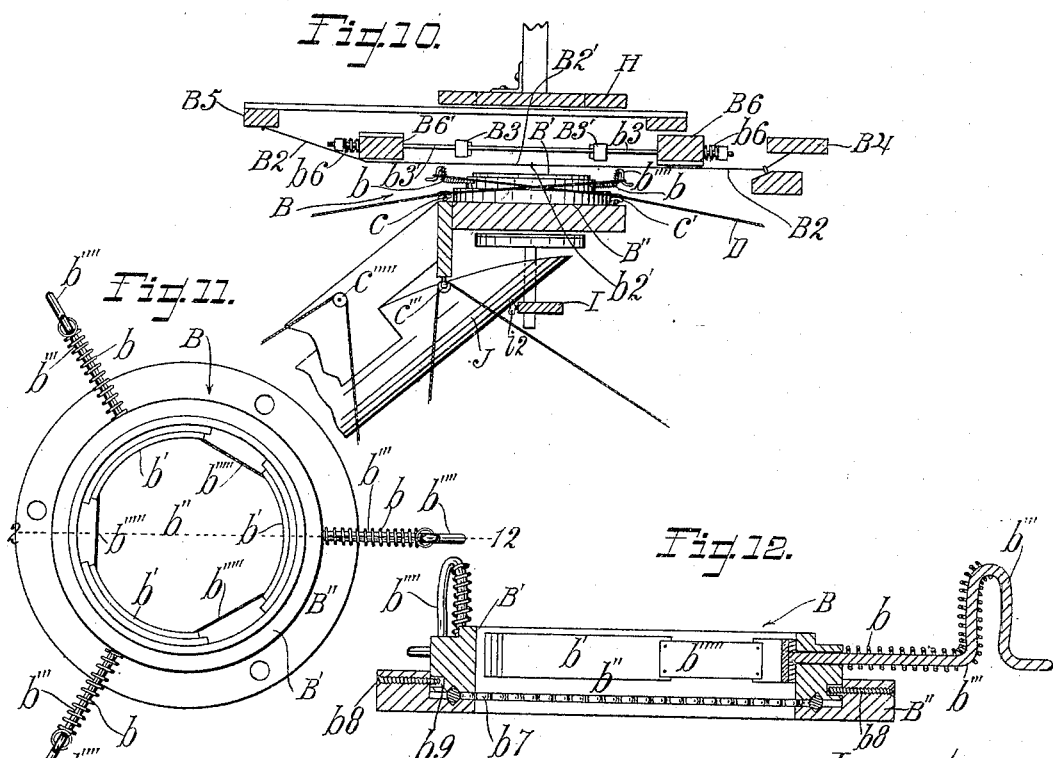
Witnesses
Berry Kingman
Alfred L. Townsend
Inventor
Zachary Taylor George
Administrator of the Estate of John Clark Wilson, Dec'd
by Hazard Townsend
atty.
THE NORRIS PETERS CO., PHOTO-LITHO., WASHINGTON, D. C.

No. 639,375. Patented Dec. 19, 1899.
J. C. WILSON, Dec'd.
Z. T. GEORGE, Administrator.
FRUIT WRAPPING MACHINE.
(Application filed Feb. 26, 1897.)
(No Model.) 7 Sheets—Sheet 7.
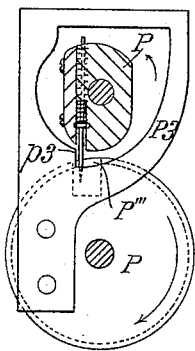
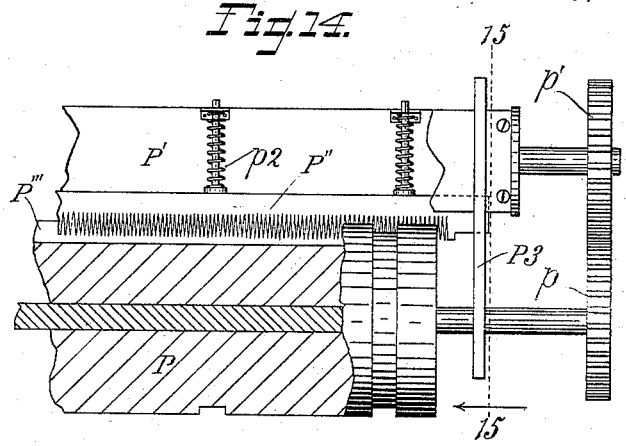
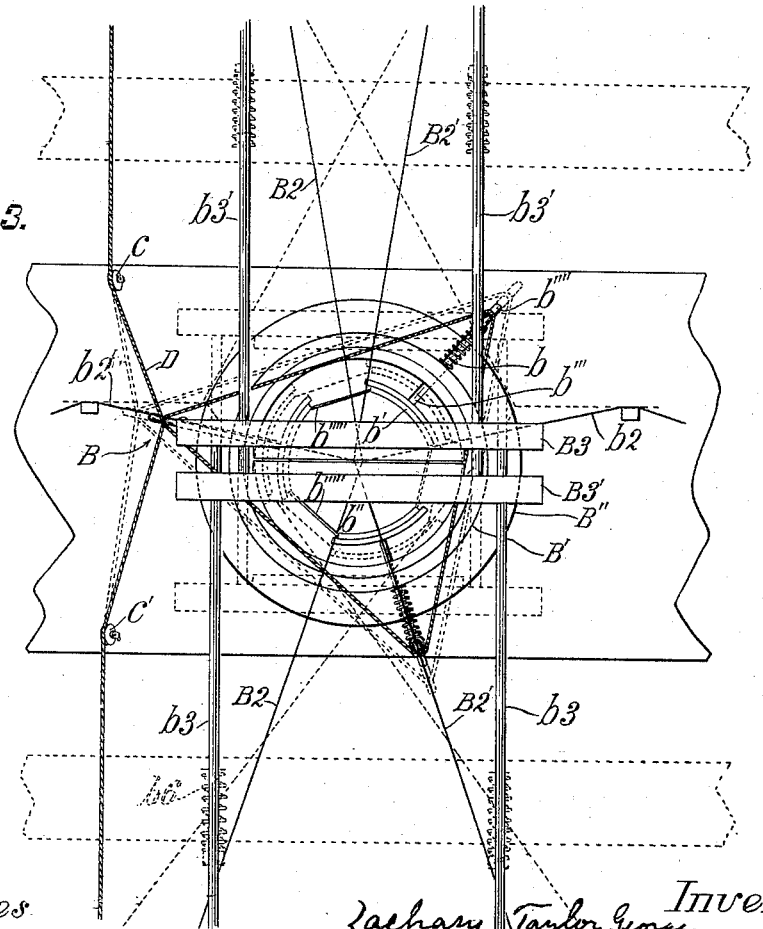
Witnesses
Perry Kingman
Alfred L. Townsend
Inventor
Zachary Taylor George
Administrator of the
Estate of John Clark Wilson Dec'd
by Hazard & Townsend
Attys

UNITED STATES PATENT OFFICE.

ZACHARY TAYLOR GEORGE, OF LOS ANGELES, CALIFORNIA, ADMINISTRATOR OF JOHN CLARK WILSON, DECEASED, ASSIGNOR TO SIMPSON G. WILSON, OF SAME PLACE.

FRUIT-WRAPPING MACHINE.

SPECIFICATION forming part of Letters Patent No. 639,375, dated December 19, 1899.

Application filed February 26, 1897. Serial No. 625,208. (No model.)

*To all whom it may concern:*

Be it known that JOHN CLARK WILSON, deceased, who at the time of his decease was a citizen of the United States, residing at South Pasadena, in the county of Los Angeles and State of California, invented a new and useful Fruit-Wrapping Machine, of which the following is a specification.

This invention consists in a machine by means of which oranges, apples, and other globular fruits and bodies can be covered with wrappers of paper or other suitable material in such a manner that the same will not accidentally unwrap.

One object of the invention is to provide automatic means which will apply wrappers to oranges and other globular fruits and bodies in an economical and permanent manner and without injury to the fruit. This machine is designed to draw a wrapper tight upon the fruit and twist the overlap of the wrapper together in such a way as to prevent the wrapper from coming unwrapped from the fruit even though roughly handled or rolled about. This is accomplished by automatic means.

The machine is so constructed that any desirable number of wrapping devices can be arranged therein side by side to be operated simultaneously, the oranges or other fruits being fed into the machine through a number of chutes which respectively deliver the fruits to the wrapping devices.

By this invention different-sized fruits or other globular bodies can be wrapped by one and the same machine.

The accompanying drawings illustrate the invention.

Figure 1 is a side elevation of a machine embodying this invention and provided with five wrapping devices, so that the machine will simultaneously wrap five fruits. This view is from the side of the machine toward which the fruits are fed. Parts are broken away to show positions of parts which would otherwise be hidden in this view. Fig. 2 is a plan of the machine. Parts of the horizontal cam-shaft and frame which operate the fruit-dropper and the wrapper-support are broken away to show parts beneath. The fruit-supports are open to allow the fruit to drop. Fig. 3 is a perspective fragmental detail illustrating one of the vertical cam-shafts which actuate the wrapper-clamping appliances, the fruit-clamping device, and the fruit-rest. Fig. 4 is an end elevation of the machine looking from the right toward the left in Figs. 1 and 2. Fig. 5 is an elevation of the other end of the machine. Fig. 6 is a fragmental sectional elevation on line 6 6 looking toward the right in Figs. 1 and 2 and toward the left in Fig. 7. Two positions are indicated, one in dotted lines. Fig. 7 is a fragmental side elevation at the end of the machine which is at the right in Figs. 1 and 2. Parts are broken away to show parts which would otherwise be hidden. This view is seen looking toward the paper-roll from the left in Fig. 6. Fig. 8 is a fragmental sectional detail of parts shown in Fig. 7. Line 8 8, Fig. 7, indicates the line of section and the arrow shows the direction of sight. The wrapper-clamps are shown closed and the orange-supports open. Fig. 9 is a fragmental plan view showing three of the wrapping devices in detail. The several clamping appliances are shown open. The several fruit-clamps are shown turned to different positions to show the various positions the belts and the rests therefor assume when the fruit-clamps rotate. Fig. 10 is a fragmental sectional detail on line 10 10, Fig. 9. The arrow on said line indicates the direction of sight. Fig. 11 is a plan of the fruit-clamp detached and open. Fig. 12 is an enlarged section of the fruit-clamp on line 12 12, Fig. 11. Fig. 13 is a plan detail of the fruit and wrapper clamping appliances. Solid lines indicate the position of parts when the fruit and wrapper are clamped. Dotted lines indicate the position of parts when the clamps are open. Fig. 14 is a fragmental detail, partly in section, illustrating the paper-cutting mechanism. Fig. 15 is a sectional elevation of the same on line 15 15, Fig. 14. The arrow in Fig. 14 indicates the direction of sight.

A indicates the frame of the machine.

1 indicates a driving-pulley on a driving-shaft 2, through which power is applied to the machine from a belt 1'; but it is to be understood that power may be applied through any other means desired. In case of a small machine power may be applied by a crank (not shown) to be turned by hand. Power is communicated from the shaft 2 to the other parts of the machine, and this may be by any suitable gearing, such as sprocket-wheels and chains, cog-wheels, belts and pulleys, &c.

The invention comprises the combination of a device for holding the ends of a fruit-containing wrapper, a device for clamping the wrapper and the fruit contained therein, and means for causing the rotation of one of such devices with relation to the other. A rotary fruit-clamping device and means for rotating such device are preferably provided to rotate the fruit and its wrapper while the ends of the wrapper are held stationary by the clamp. B indicates in a general manner the rotary fruit-clamping device.

C indicates a pulley mounted on the driving-shaft 2, and D is a belt running around said pulley and running around said fruit-clamping device and adapted to be driven by the driving-pulley C and to rotate the fruit-clamp B. Means are provided for holding the fruit-clamp normally released in combination with means for closing and rotating the clamp, so that when the means for closing and rotating the clamp are relaxed the clamp will be thrown open to release and to receive the fruit. The springs $b$ operate to hold the jaws $b'$ withdrawn from the center of the clamping device to allow a fruit to enter or to fall from the clamping device.

The fruit-clamping device comprises the combination of a frame B', mounted to rotate and provided with a central opening $b''$, through which a fruit can pass, reciprocating rods $b'''$, arranged radiating from said opening and adapted to move axially through the frame toward the center of the opening, the fruit-clamping heads $b'$, arranged on the inner ends of said rods, respectively, belt-retaining means, such as the hook portion $b''''$, arranged on said rods at the outer end thereof, a belt D, passed around said belt-retaining means and around the driving-pulleys C $c''$ and around the guiding and sustaining pulleys $c$, $c'$, $c'''$, $c''''$, and $c'''''$ and suitable intermittent belt tightening and releasing means for tightening and releasing the belt to move the clamp-rods in and out axially, thus to cause the fruit-clamps $b'$ to clamp the fruit and at the same time cause the belt to be driven by pulleys C $c''$ to rotate the fruit-clamp until the belt is again relaxed and the springs $b$ throw the rods $b'''$ outward to withdraw the fruit-clamping pieces $b'$ from the fruit to release the fruit. Any suitable yielding means may be employed for normally holding the rods $b'''$ outward. In the drawings is shown a helical spring around the rods and arranged to engage the frame B' and the rods $b'''$ to hold the clamping-pieces $b'$ normally outward against the frame. The rotary clamp is carried by ball-bearing $b^7$.

$b^8$ indicates screws in the bearing-plate B'' extending into an annular peripheral groove $b^9$ to form stops to hold the rotary frame of the fruit-clamp in position on the balls of the bearing.

2' indicates a shaft connected with driving-shaft 2 by sprocket-chain 2'' and carrying belt-driving pulleys $c''$.

The intermittent means which are provided for tightening and releasing the belt comprise a weight C', having a pulley $c''''$, which is hung upon the belt D, thus to hold the same taut, and this weight is of sufficient gravity to readily overcome the yielding means, such as the springs $b$, which hold the fruit-clamp open, and to draw the clamping-rods $b'''$ and the clamp-pieces $b'$ inward toward the center of the opening $b''$ and to clamp the fruit tightly between the clamp heads or pieces $b'$. The fruit-clamping heads $b'$ are arranged in a circle and adapted to move toward and from a common center and are connected together with elastic strips $b'''''$, arranged in chords of said circle, so that when a fruit falls into the circle its sides will first engage the elastic strips and be thereby centered and held in position until the clamps can be brought against the fruit to clamp it.

In practice the power-shaft 2 and the pulley C will rotate continuously while the machine is in operation; but it is not desirable to continuously rotate the fruit-clamps. So long as the weight C' holds the belt D taut the pulley C will drive said belt. Suitable means are provided for lifting the weight to allow the belt to loosen, and when the weight is lifted and the belt loosened the pulley C will rotate freely without driving the belt, and at the same time the springs $b$ will hold the fruit-clamp open to allow the introduction thereinto and removal therefrom of fruit.

E indicates a cam-shaft which is connected with the driving-shaft 2 by any suitable means, such as sprocket wheels and chains 3, 4, 5, 6, 7, and 8.

$e$ is a cam on the cam-shaft E, arranged to engage a head F, which carries a rod $f$, which is fastened to the weight-support $f'$. The cam $e$ is of such shape that during a portion of the rotation of the cam-shaft E it will lift the head F sufficiently to cause the weight-support $f'$ to lift the weight C', thus to loosen the belt D, so that the driving-pulley C will not drive the belt, and during another part of the rotation of the shaft E the head F falls sufficiently to lower the weight-support $f'$ from the weight, thus to allow the weight to hold the belt D taut. The weight-support head F is preferably a lever hinged to the frame A of the machine, as indicated at $a$, Figs. 4, 5, and 6, and the weight-supporting cam $e$ is preferably oval in form and eccentrically arranged upon the shaft E, so that the raising and lowering of the weight are accomplished without any undue strain or jerking.

$e'$ indicates the fruit-dropper cam, which is fastened upon the shaft E and is arranged to operate the fruit-dropping device G and also to raise and lower the wrapper-support H.

The weight-supporting cam $e$ and fruit-dropper cam $e'$ are arranged in such relation to each other that the fruit-dropping device will be operated to drop the fruit onto the wrapper held by the wrapper-support H and thence through into the fruit-clamping device at such a time as the fruit-clamping device will be open to receive the fruit.

I indicates a fruit-support arranged to reciprocate horizontally to be brought under and removed from beneath the fruit-clamping device to receive the fruit when it falls into the clamping device and to be withdrawn from beneath the fruit after the wrapping has been completed, thus to allow the fruit when released by the clamps to fall down into a chute J, which conducts it to a carrier J', which carries it away from the chute.

$B^2$ $B^{2'}$ are two wrapper-clamping members with bent faces crossing each other, and $b^2$ $b^{2'}$ are yielding means for normally holding the angles of the bent faces apart to form the opening to allow a fruit to pass between the members $B^2$ $B^{2'}$, and suitable means are provided for moving such members to close said opening, as in Fig. 13. Said members are preferably composed of wires, and the yielding means $b^2$ $b^{2'}$ for holding the bent faces apart to form the fruit-receiving opening are preferably formed of india-rubber bands or other springs, which are fastened to the wires and arranged to draw the wires across each other to form an opening through which the fruit can drop.

$B^3$ $B^{3'}$ indicate two wrapper-clamping jaws, and means are provided to open and close these jaws centrally above the fruit-clamping device B and also above the wrapper-clamping members $B^2$ and $B^{2'}$. The wrapper-clamping members are arranged transverse said jaws and play toward and from each other in a plane parallel with the plane of the jaws. The fruit-clamp rotates around a vertical axis, and the clamping jaws and members move in horizontal planes parallel with each other and having such axis midway between them. The angles of the bent clamping-faces of the wrapper-clamping device move horizontally and are virtually at all times of their movement in a vertical plane which extends midway between said jaws. Various means may be provided for moving the bent faces of the wrapper-clamping members toward and from each other to clamp the wrapper between the clamped fruit and the wrapper-clamping jaws $B^3$ and $B^{3'}$; but where such clamping members are wires, as shown, this is accomplished by fastening one end of the wires to a movable support $B^4$, while the other end is fastened to another support $B^5$. When the movable wire-support $B^4$ is drawn away from the wrapper-clamping jaws $B^3$ $B^{3'}$, this straightens the wires to an extent, overcoming the springs $b^2$ $b^{2'}$ and drawing the angles of the bent wires $B^2$ $B^{2'}$ toward each other into the position shown in solid lines in Fig. 13. The wires are arranged to normally stand close above the top of the rotary fruit-clamp, as shown in Figs. 6 and 10, so that they will ordinarily be slightly below the top of the fruit in such clamp, so that when the wires are drawn to bring their angles together above the fruit the wires will draw the wrapper tightly up over the fruit. The flexibility of the wires especially adapts them to thus draw the wrapper tightly over the top of the fruit. They will bend to conform to the top of the fruit and will slide up over the fruit and hold the wrapper tightly thereagainst.

K K' indicate two vertical cam-shafts, each of which is provided with four cams $k, k', k'',$ and $k'''$. The cams $k$ operate the fruit-support I to slide it beneath the fruit-clamp and withdraw it from under the fruit-clamp. The cams $k'$ $k''$ operate the wrapper-clamping jaws $B^3$ $B^{3'}$, and the cam $k'''$ operates the clamp members or wires $B^2$ $B^{2'}$. The cam $k'''$ operates against a bar $B^4$, which forms the movable support of the ends of the wires at one side of the clamp, and the springs $b^2$ $b^{2'}$ draw the wires $B^2$ $B^{2'}$, and thus return the movable bar $B^4$ when the cam is withdrawn therefrom. The cams $k'$ $k''$ operate to throw two movable bars $B^6$ $B^{6'}$ in opposite directions. The bar $B^6$ is connected to the wrapper-clamping jaw $B^3$ by rods $b^3$, and the bar $B^{6'}$ is connected to the wrapper-clamping jaw $B^{3'}$ by rods $b^{3'}$.

$b^6$ indicates spring connections by which the rods $b^3$ $b^{3'}$ are fastened to their respective bars $B^6$ and $B^{6'}$, so that the pressure exerted upon the wrapper by the jaws $B^3$ and $B^{3'}$ will be yielding, thus to accommodate the different thicknesses of folded wrapper which may be clamped between such jaws. Preferably the cams $k'$ and $k''$ are arranged to draw the jaws $B^3$ and $B^{3'}$ together to clamp the wrapper an instant before the wires $B^2$ and $B^{2'}$ clamp the wrapper, so that the wrapper when clamped between the jaws $B^3$ and $B^{3'}$ will be somewhat spread out, and the wires then draw the wrapper together, thus tightening it over the fruit. The vertical cam-shaft K and the horizontal cam-shaft E are connected together by gearing $e^2$ and $k^2$, and the several parts are so timed in their operation that the cam $e'$ will operate the fruit-dropper first, thus allowing the fruit to drop through onto a wrapper upon the wrapper-support H and through the wrapper-support H down onto the fruit-support I. Then the cams $k'$ and $k''$ operate the clamp-jaws $B^3$ $B^{3'}$ to clamp the wrapper in one direction, and the cam $k'''$ operates the clamp members or wires $B^2$ and $B^{2'}$ to clamp the wrapper in the other direction. Then the cam $e$ removes from the head F, thereby lowering the weight-support $f'$ and allowing the weight C' to draw the belt taut, thus to clamp the fruit and wrapper and rotate the same, thus twisting the wrapper tightly at the places where it is clamped. A further rotation of the shafts E and K causes the cam $k$ to move the fruit-rest bar $i$, thus to cause the fruit-rest I to withdraw from beneath the fruit, and such rotation also causes the cam $e$ to again lift the head F, thus to raise the weight-support $f'$ and lift the weight to loosen the belt D and allow the springs $b$ to open the fruit-clamp and allow the fruit to drop into the chute J and pass out of the machine.

L indicates the chute which delivers fruit to the machine.

L' indicates a rotating roller provided with pins arranged at the end of the chute L to receive the fruits between the pins $l$ and deliver them one by one into a chute L'', which delivers the fruit to the fruit-dropper G. The fruit-dropper G comprises two bars $g\ g'$, arranged on a support $g''$ to slide horizontally toward and from each other.

$g^2$ indicates a vertically-reciprocating wedge or moving slide with outwardly-diverging guideways $g^3\ g^3$, in which the fruit supports or bars $g\ g'$ are embraced. A slide or wedge $g^2$ is provided at each end of the machine, and the fruit-supporting bars $g\ g'$ are adapted to move horizontally toward and from each other, and they extend from end to end of the machine, beneath the ends of the several chutes L'', and are simultaneously operated on by the said wedge-slides $g^2$. They are slightly hollowed at intervals, as at $g^4$, to conform to the fruit. The wrapper-support H is carried by the rod $m$, and is thereby connected with the slide or wedge $g^2$, and when the wedge-slides $g^2$ are lowered the wrapper-support H moves downward toward the fruit-clamp and the falling fruit carries the wrapper down with it into the fruit-clamp. The fruit-feeding roller L' is connected with the shaft 9, which carries the sprocket-wheel 6, by suitable gearing, such as the sprocket-wheels and chain 10, 11, and 12, and is timed to feed one fruit to each revolution of the shaft E. The fruit-dropping slide $g^2$ and the wrapper-support H are connected with the fruit-dropper head M by the rod $m$, and the cam $e'$ is in form a segment of a circle greater than half a circle, so that the fruit-dropper slide and the wrapper-support are held in their elevated position throughout a greater portion of the revolution of the shaft E, thus giving plenty of time for the fruit and the wrapper to take position upon their respective holders. The heads M are hinged to the frame, as at $a'$.

N N' indicate a pair of wrapper-feeding rollers carrying endless wrapper-feeding belts N''. Said rollers extend on opposite sides of the fruit-dropping device, and two of said wrapper-feeding belts are provided beneath each of the fruit-dropping chutes L'', one on each side of the path, through which the fruit will drop from such chute. The rollers N N' are connected by sprocket-wheels and chain $n\ n'\ n''$, and the whole is driven by sprocket-chain $n'''$, which is driven by sprocket-shaft O, which receives power from shaft E through sprocket-chain O'.

P P' indicate the parallel paper-cutting rollers and shaft geared together by cogs $p\ p'$ to rotate at the same speed. $p^2$ indicates a sprocket-chain driven by shaft E and driving the paper-cutting shaft P', which carries a paper-cutting knife P'', arranged to strike into the knife-receiving groove P''' in the paper-cutting roller P at each rotation of the roller and shaft. The knife and groove extend along the peripheries of the shaft and roller, respectively.

Q Q' indicate two paper-feeding rollers which are geared together by gears $q\ q'$ and are driven by a sprocket-chain $Q^2$, which takes its power from shaft O.

R indicates paper reels or rolls mounted on their axles $r$, which are detachably journaled in brackets $r'$. The paper is led from the reels through between the paper-feeding rollers Q Q' and paper-cutting roller and shaft P P' and under the wrapper-feeding roller N and belts N''.

S indicates a wrapper-receiving table, on the top of which are wires $s$ to support the wrappers as they pass from the cutter-roller and shaft P P' to the vertically-moving wrapper-support H. The wrapper-feeding roller N is provided with flaps $n^2$, consisting of stiff leaves of flexible material, such as leather or oil-cloth, fastened by one edge to the rollers and curved around the roller and which fall toward the table as the roller revolves and fall upon the paper as it comes from the cutters P P' and flatten it down upon the table, so that it will readily and without fail pass beneath the wrapper-feeding roller N and belts N''.

The inner edge of the wrapper-table is provided with notches $s'$, which allow the projecting ends of the wrapper-carrying wires $h$ of the wrapper-supports H to pass up to form a continuation of the track formed by the wires $s$. In practice the paper passes from the rolls R and thence between the rollers Q Q' and cutters P P' and is there cut into the proper size for wrappers, and the wrapper passes thence over the table and onto the wrapper-support and is lowered by said support whenever a fruit is dropped and is carried down by such fruit through the hole $h'$ in the support H and between the clamps, where it is clamped and twisted about the fruit.

$p^2$ indicates springs to force the wrapper-cutting knife P'' into the groove P'''. The shank of the knife rides in a cam-collar $P^3$, which is shaped to retract the knife into the shaft P', but is provided with an offset or notch $p^3$, approximately between the axes of the roller and shaft, which allows the knife to be suddenly released, when it is in position to be shot by the springs $p^2$ into the groove P'''. This instantly cuts the paper. The edge of the knife is deeply serrated, so that the cutting is accomplished without displacing the paper.

T indicates an elevator chain or belt which is provided with pins $t$ to lift the fruits from fingers l', onto which they are placed by a supplemental carrier-chain j, which receives the fruit from the main fruit-carrier J'.

U U' indicate two sprocket-chains for communicating power from shaft E to shaft O, from which the motion is imparted to the paper-feeding rollers Q Q'.

u u' indicate two sprocket-wheels of different sizes mounted on the shaft O and respectively receiving their power from the sprocket-chains U U', which are driven by the sprocket-wheels $e^5$ $e^6$, which are driven by the shaft E, on which they are mounted. In practice only one of the sprocket-wheels u or u' will be fixed to the shaft O at the same time, so that when it is desired to run the wrapper cutting and feeding mechanism to deliver one-sized wrapper for small fruit the smaller wheel u will be fixed to the shaft O and the larger wheel u' loose, thus to drive the wrapper feeding and cutting device with greater rapidity with relation to the shaft E and the consequent dropping of fruit; but if large fruit is to be wrapped and large wrappers therefore required the small sprocket-wheel u will be released from the shaft O and the large sprocket-wheel u' will be fixed to the shaft O, thus to make the sheets run slower. $u^2$ $u^3$ indicate set-screws for fastening the wheels to and releasing them from the shaft O. Any other suitable gearing may be substituted for this to change the speed of the shaft O with relation to the shaft E.

In practical operation the fruits are fed into the chutes L, down which they roll until they are taken up by the pins l of the roller L and delivered into the chutes L'', down which they roll until they pass out of the ends of the chutes L'' and fall upon the fruit-rests g g'. In the meantime the operation of the machine has caused a wrapper to be severed from the sheet of paper r', and the same has been deposited upon the holder H. The cams e' then release the heads M and allow the wedge $g^2$ to descend to force the fruit-supports g g' apart, thus allowing the fruit to drop, and at the same time the wrapper-support H lowers so that the fruit is caught by the wrapper while the wrapper is moving downward. The fruit then forces the wrapper through the hole h' and both fall together between the open clamps into the twisting device. The cams k' and k'' operate the bars $B^6$ $B^{6'}$ to draw the clamp-jaws $B^3$ $B^{3'}$ together to clamp the overlap of the wrapper, and the cam k''' throws the bar $B^4$ to draw the clamp-wires $B^2$ $B^{2'}$ to draw the wrapper tight over the top of the fruit and compress it into a stem beneath the jaws $B^3$ $B^{3'}$. The cams e then release the head F and allow it to fall, thus withdrawing the support f' from the weight C'. This tightens the belt D, thus forcing in the clamp-heads b' and rotating the fruit-clamp B', thereby twisting the neck of the wrapper while it is held by the clamps and forming a bond in said twist which does not readily become free. The cams e and e' then operate their respective heads F and M, and the weight being lifted by the weight-support f' loosens the belt D and the springs b throw the heads b' outward to release the fruit. Then the cam k throws the bar i to withdraw the fruit-support I from beneath the fruit, which then falls into the chute J, which conducts it to the carrier J', whence it passes to the elevator and out of the machine.

The cam k is slender, so that it throws the bar i quickly, and the other cams are broader, so as to move their respective bars more slowly. The cams k, k', and k'' operate in frames w w' w'' at the ends of their respective bars, so as to throw the bars and return them fully at each complete rotation of the shaft.

Now, having described the invention, what is claimed as new, and desired to be secured by Letters Patent, is—

1. The combination of fruit holding and rotating mechanism; a pair of wrapper-clamping jaws arranged to close centrally above such mechanism; means for operating said jaws; two wrapper-clamping members each of which has an angularly-recessed clamping-face, and both of which are arranged to play between the fruit holding and rotating mechanism and the wrapper-clamping jaws; and means for moving said members toward each other and for holding them together and for retracting them from each other.

2. The combination of fruit holding and rotating mechanism; a pair of wrapper-clamping jaws arranged to close centrally above such mechanism; means for operating said jaws; a bent wire crossing said jaws between the plane of the fruit holding and rotating mechanism and the plane of the jaws; a like bent wire arranged in like manner, but in reverse position, so that the extended axis of the fruit-rotating mechanism is between the angles; means for normally holding the angles of said wires apart; and means for moving said wires to draw the angles thereof toward said extended axis.

3. In a wrapper-clamping device for a fruit-wrapping machine, the combination of two wrapper-clamping jaws with means to open and close them, and two wrapper-clamping members having bent clamping-faces crossing each other and arranged transverse said jaws with their angles virtually in a vertical plane which extends midway said jaws; and means for moving the bent faces of the wrapper-clamping members toward and from each other.

4. In a wrapper-clamping device for a fruit-wrapping machine, the combination of two bent wires arranged crossing each other; means for normally holding the ends of the wires stationary; means for normally holding the respective angles of the wires apart; and means for moving the ends of the wires to bring the angles of the wires toward each other.

5. The combination of a fruit clamping and rotating device; wrapper-clamping jaws arranged to close to clamp toward the extended axis of the fruit-clamp; two wires arranged in a plane which extends between the planes of said fruit-clamp and said jaws, and having one end of each wire fastened to a support at one side of said axis, and the other ends of said wires fastened to a support on the other side of said axis; resilient means for holding the wires bent, and normally crossed on opposite sides of said axis; and means for drawing the bends of the wires toward each other.

6. The combination of fruit holding and rotating mechanism; two wrapper-clamping jaws arranged to close centrally above such mechanism; two bars arranged on opposite sides, respectively, of said mechanism; rods connecting the bars with the jaws respectively, the bar which is on one side of said mechanism being connected with the jaw which is on the other side of said mechanism, and vice versa; means for normally holding the bars toward each other; and means for moving said bars from each other.

7. The combination of fruit holding and rotating mechanism; two wrapper-clamping jaws arranged between two bars to close centrally above such mechanism; one of said bars operatively connected with the jaw which is farthest from it; the other of said bars operatively connected with the other jaw; means for normally holding the bars toward each other; and rotating cams between said bars arranged to simultaneously actuate said bars to move them apart.

8. The combination of two bars arranged to move toward and from each other; two jaws arranged between said bars; means connecting one of the bars with the jaw which is farthest from it; means connecting the other of the bars with the other jaw; and means for moving the bars toward and from each other.

9. The combination of two bars arranged to move toward and from each other; two jaws arranged between said bars; rods connected by springs with one of said bars and connected slidingly with the jaw nearest such bar, and fixed to the farthest jaw; rods connected by springs with the other of said bars and connected slidingly with the jaw nearest said bar and fixed to the jaw farthest from said bar; and means for moving the bars toward and from each other.

10. The combination of fruit holding and rotating mechanism; two wrapper-clamping jaws arranged between two bars to close centrally above such mechanism; one of said bars operatively connected with the jaw which is farthest from it; the other of said bars operatively connected with the other jaw; means for normally holding the bars toward each other; two wrapper-clamping members each of which has an angularly-recessed clamping-face and both of which members are arranged to play between the planes of the fruit holding and rotating mechanism and the wrapper-clamping jaws; means connected with said members to move them to draw the angles thereof toward each other; rotating cams connected together and arranged to respectively actuate the bars to move them apart, and the wrapper-clamping members to move them toward each other.

11. The combination of a wire-support; two wires fastened thereto at a distance apart and crossed upon each other and bent and re-crossed upon each other and fastened to a movable wire-support; resilient means connected with a support and with one of said wires at the angle thereof; resilient means connected with a support and with the other wire at the angle thereof; and means for moving the movable wire-support from and toward the other wire-support.

12. The combination of a fruit holding and rotating clamp; means for operating said clamp to close and release the same; a fruit-support arranged below said clamp; means for moving the fruit-support horizontally; wrapper-clamping jaws arranged to close centrally above the fruit-clamp; wrapper-clamping members arranged between the fruit-clamp and the wrapper-clamping jaws to move in the path toward and from each other in a path parallel with the plane of said jaws, but in directions transverse to the direction of the jaws; means for operating the jaws; means for operating the clamping members; means for operating the fruit-clamp, and means for rotating said clamp.

13. The combination of a frame mounted to rotate and provided with an opening through which a fruit can pass; reciprocating rods arranged radiating from said opening and adapted to move axially; fruit-clamping pieces arranged on the inner ends of said rods respectively; yielding means for normally holding the rods outward; belt-retaining means arranged on said rods; an endless belt passed around said belt-retaining means and around a driving-pulley and around guiding and sustaining pulleys; said pulleys; and intermittent means for tightening and releasing the belt to move the clamp-rods axially and to rotate the frame.

14. The combination of a frame mounted to rotate and provided with an opening through which a fruit can pass; reciprocating rods arranged radiating from said opening and adapted to move axially; fruit-clamping pieces arranged on the inner ends of said rods respectively; yielding means for normally holding the rods outward; belt-retaining means arranged on said rods; an endless belt passed around such retaining means and around a driving-pulley and around guiding and sustaining pulleys; such pulleys; a weight provided with a pulley hung upon said belt; and means for lifting the weight to allow the belt to loosen.

15. The combination of a rotary frame provided with an opening through which a fruit may pass; reciprocating rods fastened to the rotary frame and arranged radiating from said opening; fruit-clamping heads arranged on the inner ends of said rods respectively; elastic strips fastened to and extending between the ends of said fruit-clamping heads; and means for simultaneously sliding said rods axially.

16. Fruit-clamping heads arranged in a circle and adapted to move toward and from a common center and connected together with elastic strips arranged in chords of said circle; and means for moving said fruit-clamping heads toward and from the center.

17. The combination of fruit-clamping heads arranged in a circle and adapted to move toward and from a common center; and elastic strips arranged in chords of such circle.

18. The combination of a rotary fruit and wrapper clamp provided with an opening through which a fruit can pass; a movable fruit-rest arranged below such clamp and adapted to support a fruit in said clamp; wrapper-clamping means arranged above said rotary clamp; a wrapper-support above said wrapper-clamping means and provided with a hole through which a fruit can pass; means for placing a wrapper on the wrapper-support; means for dropping a fruit onto such wrapper and through said hole and into said clamp, and onto said fruit-support; means for actuating the wrapper-clamping means; means for closing and rotating the fruit-clamp; and means for moving the fruit-rest.

19. The combination of a rotary fruit and wrapper clamp provided with an opening through which a fruit can pass; a movable fruit-rest arranged below such clamp and adapted to support a fruit in said clamp; wrapper-clamping means arranged above said rotary clamp; a wrapper-support above said wrapper-clamping means and provided with a hole through which a fruit can pass; means for placing a wrapper on the wrapper-support; means for dropping a fruit onto such wrapper over said hole; means operatively connected with said fruit-dropping means for moving the wrapper-support toward the fruit-clamp simultaneously with the dropping of the fruit; means for actuating the wrapper-clamping means; means for closing and rotating the fruit-clamp; and means for moving the fruit-rest.

20. In a fruit-wrapping machine, a vertically-moving wrapper-support provided with an opening through which a fruit can pass.

21. The combination with a fruit-rotating clamp and a fruit-dropping device; of a wrapper-support and means operatively connected with the fruit-dropping device for moving the wrapper-support toward the fruit-clamp.

22. The combination of two fruit-supports arranged to move toward and from each other in a horizontal plane; and a vertically-reciprocating wedge arranged to move said supports horizontally.

23. The combination of two fruit-supports arranged to move toward and from each other in a horizontal plane; a vertically-reciprocating wedge arranged to move said supports horizontally and a wrapper-support arranged below the fruit-supports and connected with the wedge to move vertically therewith and provided with a hole through which a fruit can pass.

24. The combination of a paper-reel; a roller provided along its periphery with a groove; a knife-carrying shaft arranged parallel with said grooved roller and journaled to revolve; gearing connecting the roller and shaft to cause them to rotate at the same speed; a knife mounted in guides in said knife-carrying shaft and arranged to move into and out of the groove; springs for throwing the knife into the groove; means for returning the knife against the pressure of the springs and for releasing the knife when it is in position to enter the groove; feed-rolls between the paper-reel and the knife to feed the paper to the knife; a wrapper-support arranged beneath a fruit-dropping device; such fruit-dropping device; means for moving severed sheets from the knife to the wrapper-support; means for intermittently actuating the fruit-dropping device; and means operatively connecting the paper-cutting roller and shaft with said means for actuating the fruit-dropping device.

25. The combination of a paper-cutting device with rolls on one side of such device for feeding paper thereto; a paper-reel to feed paper to the rolls; a paper-receiving table on the opposite side of the cutting device; a pair of rollers; and bands around the pair of rollers and arranged to move across the face of the table.

26. The combination of a paper-cutting device with rolls on one side of such device for feeding paper thereto; a paper-reel to feed paper to the rolls; a paper-receiving table on the opposite side of the cutting device; a pair of rollers, one of which is arranged above such table and is provided with a series of flaps extending part way around said roller and arranged to fall toward the table as the roller revolves; and bands around the pair of rollers and arranged to move across the face of the table.

27. The combination of a fruit-support; a rotating fruit-clamp arranged above such support and provided with an opening through which a fruit can pass; wrapper-clamping means arranged above said fruit-clamp; a belt arranged over pulleys and adapted to close and rotate the fruit-clamp; a wrapper-support provided with a hole above the opening in the fruit-clamp and arranged to move vertically; a fruit-dropping device arranged above the wrapper-support; a wrapper-receiving table; a paper-reel; a paper-cutting device; rolls for feeding paper from the reel to the cutting device and onto the wrapper-receiving table; means for moving the fruit-wrapper from the cutting device to the wrapper-support; a weight arranged to hold the belt of the fruit-clamp taut; a movable support for said weight; a cam-shaft provided with cams arranged to operate the wrapper-clamping means and to move the fruit-support; a cam-shaft geared thereto and arranged to raise and lower the weight-support; and means connecting the paper-feeding device with the cam-shaft to cause them to rotate simultaneously.

ZACHARY TAYLOR GEORGE,
*Administrator of the estate of John Clark Wilson, deceased.*

Witnesses:
JAMES R. TOWNSEND,
SIMPSON G. WILSON.